A. E. COOK & T. VANTUYL.
AUTOMOBILE PLOW.
APPLICATION FILED JUNE 19, 1909.
1,158,109.
Patented Oct. 26, 1915.
10 SHEETS—SHEET 6.
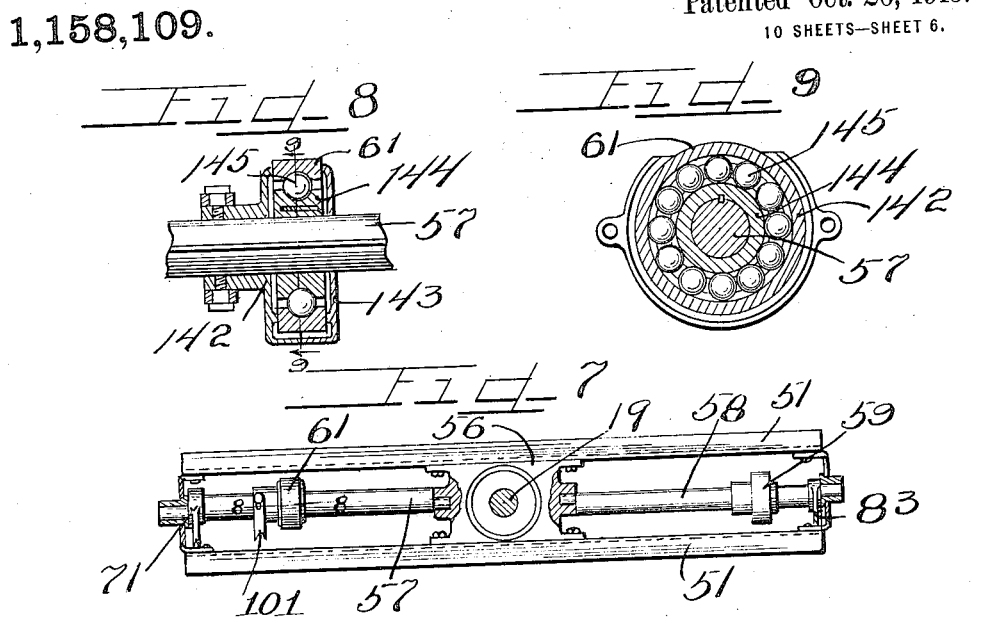
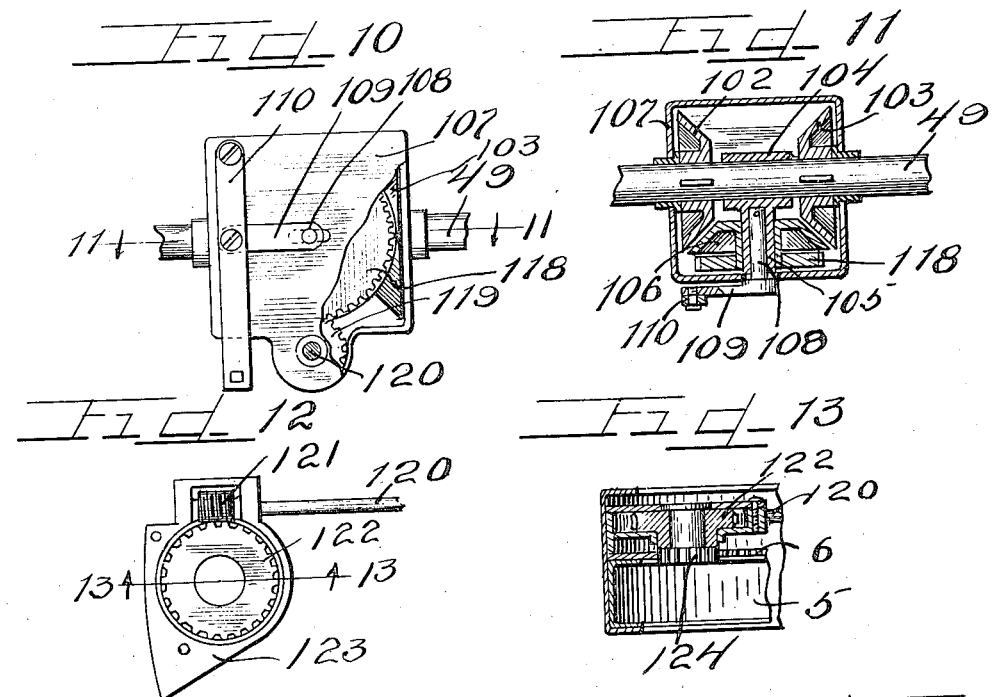

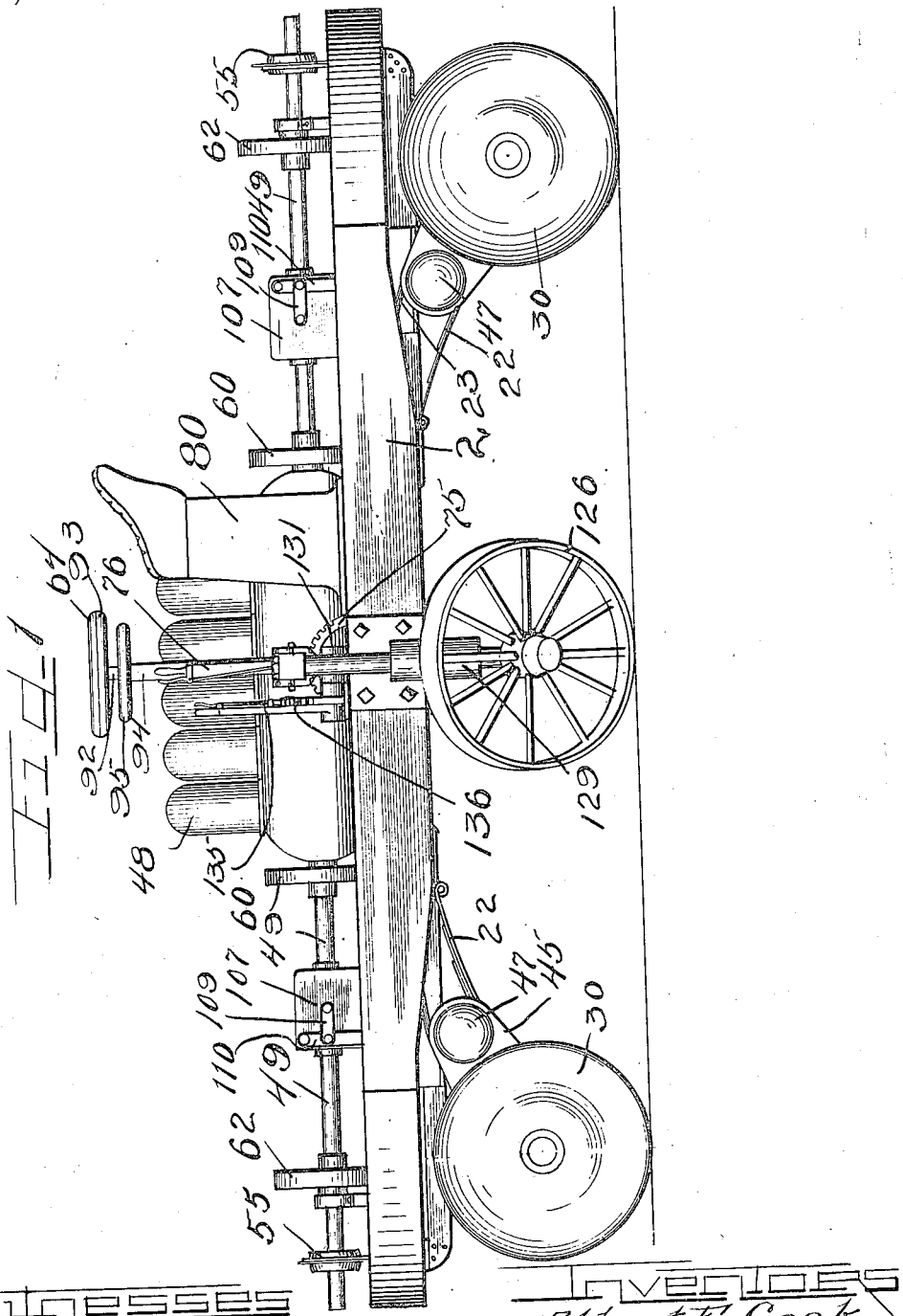

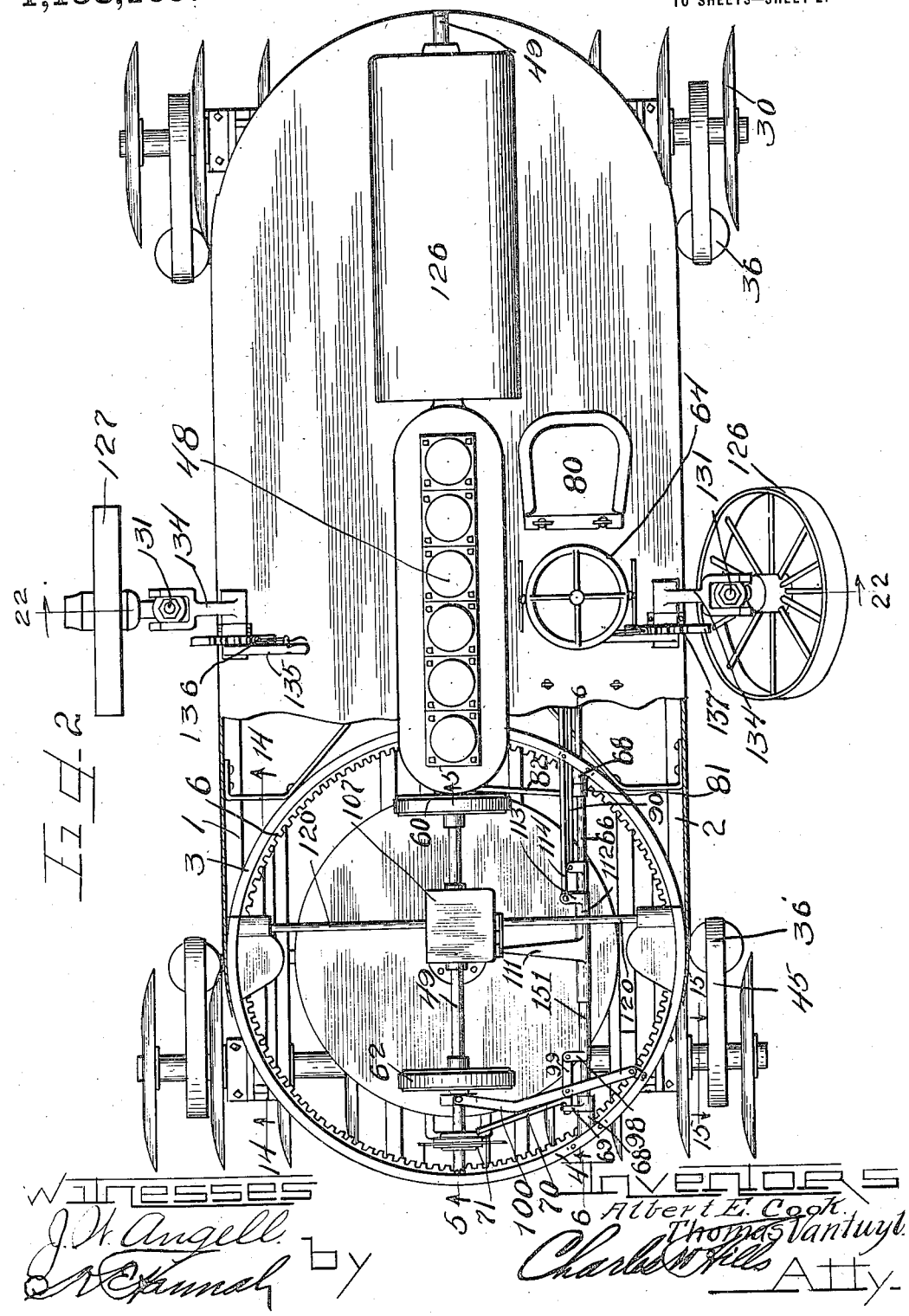

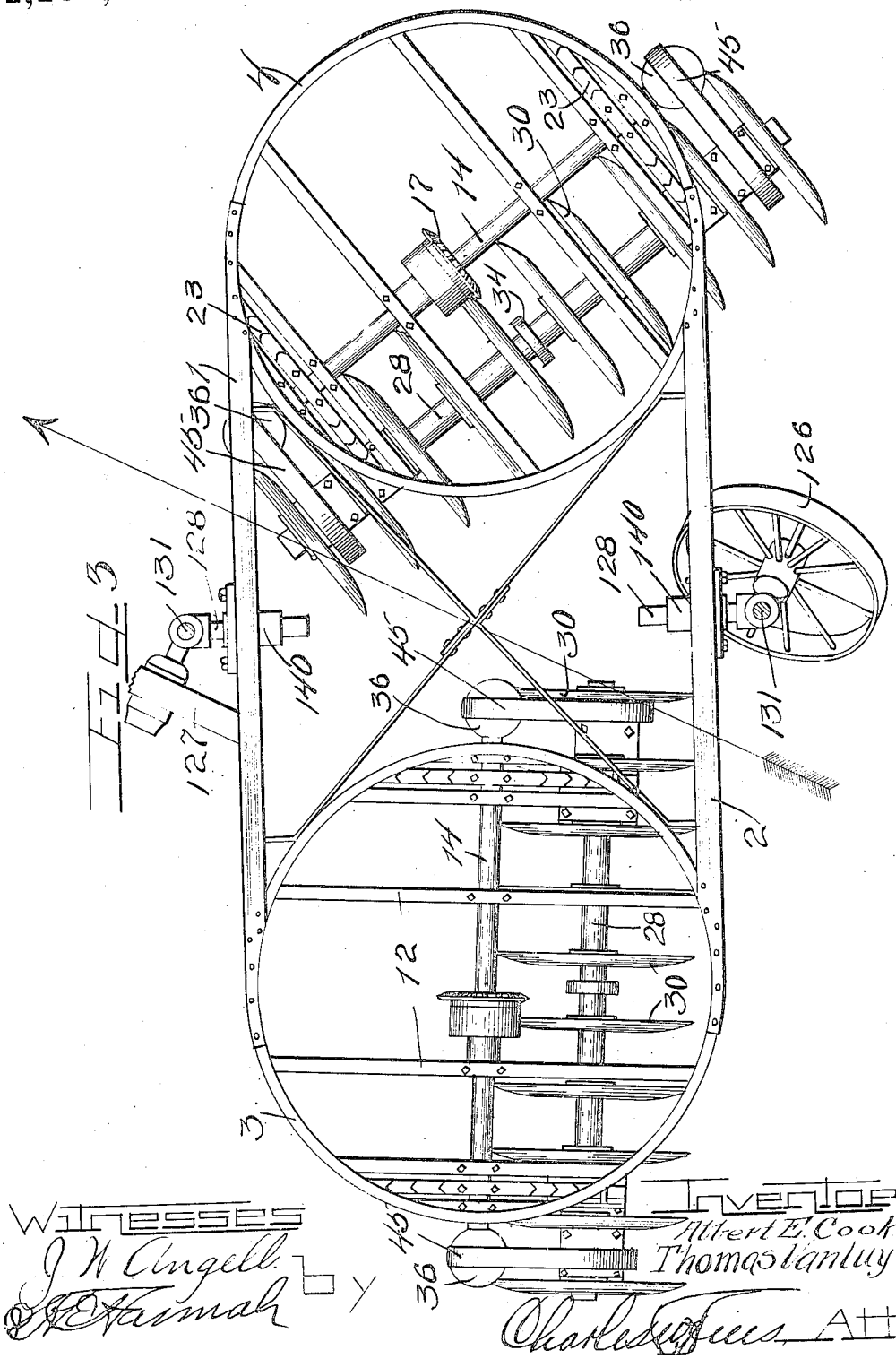

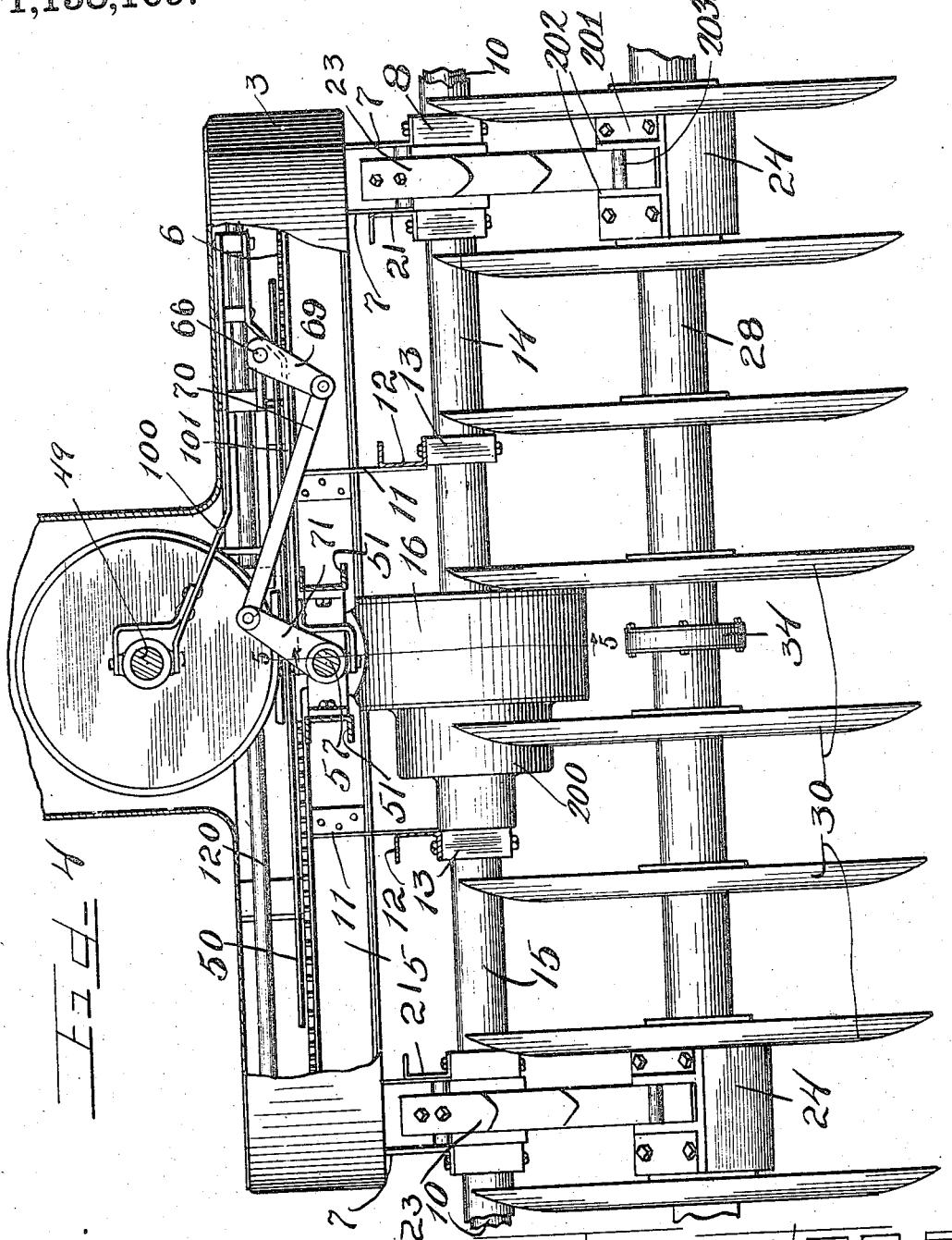

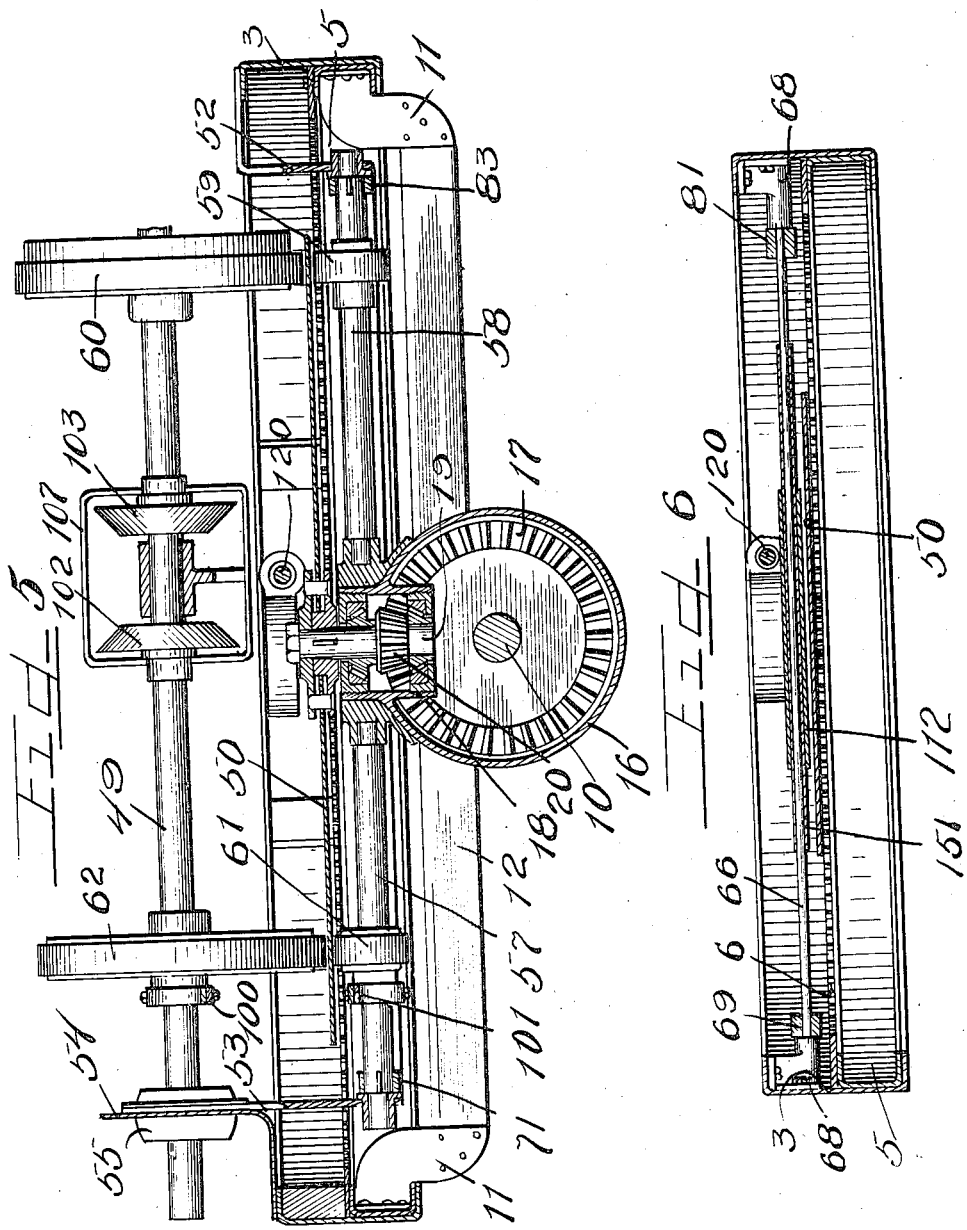

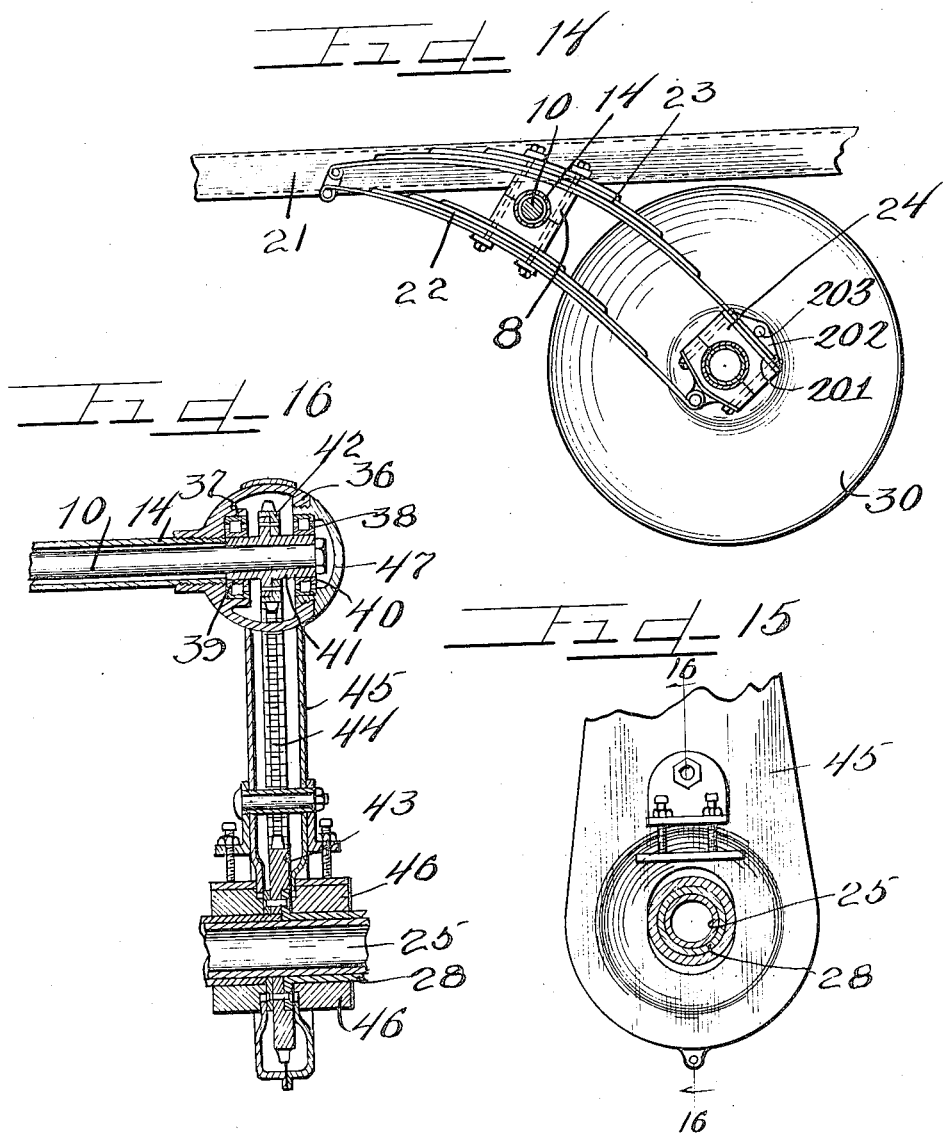

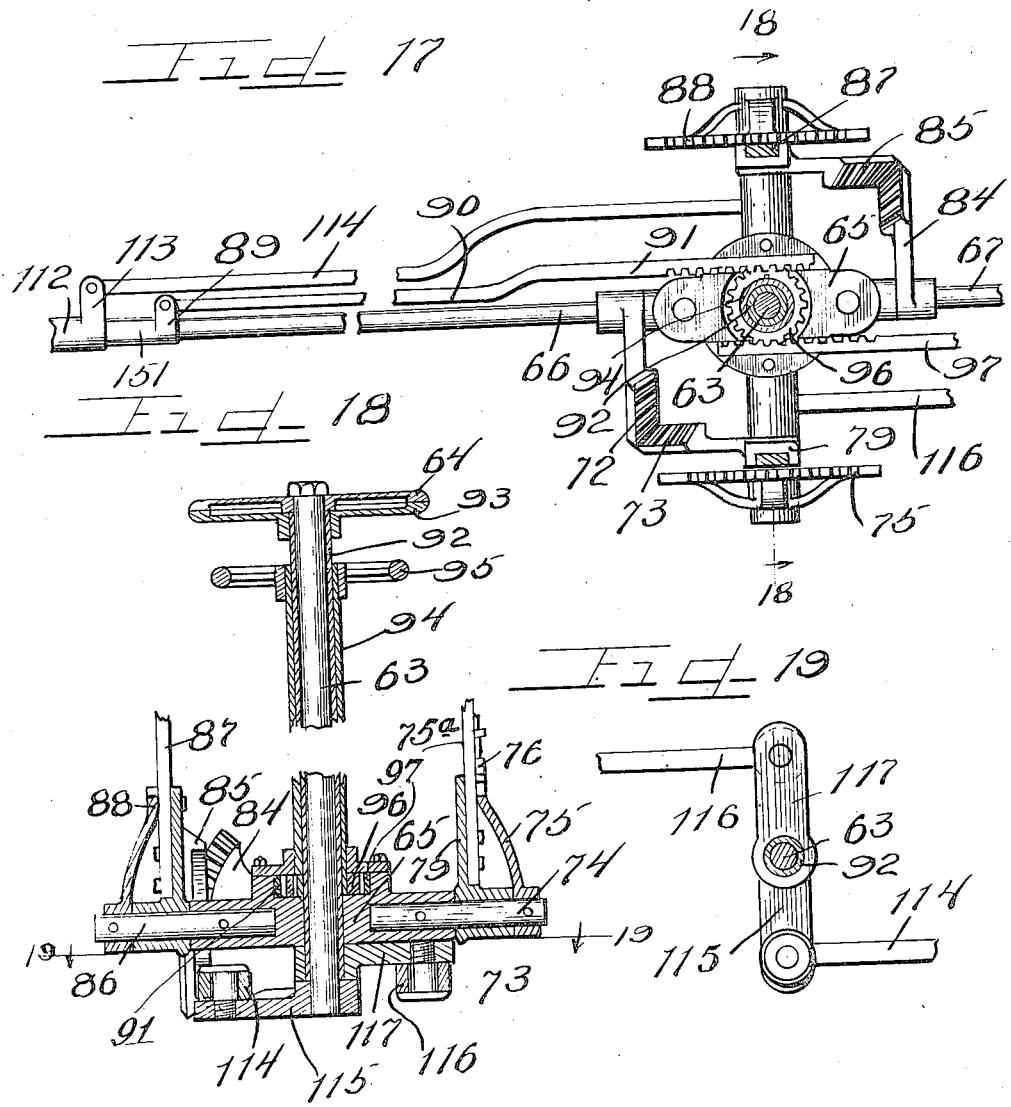

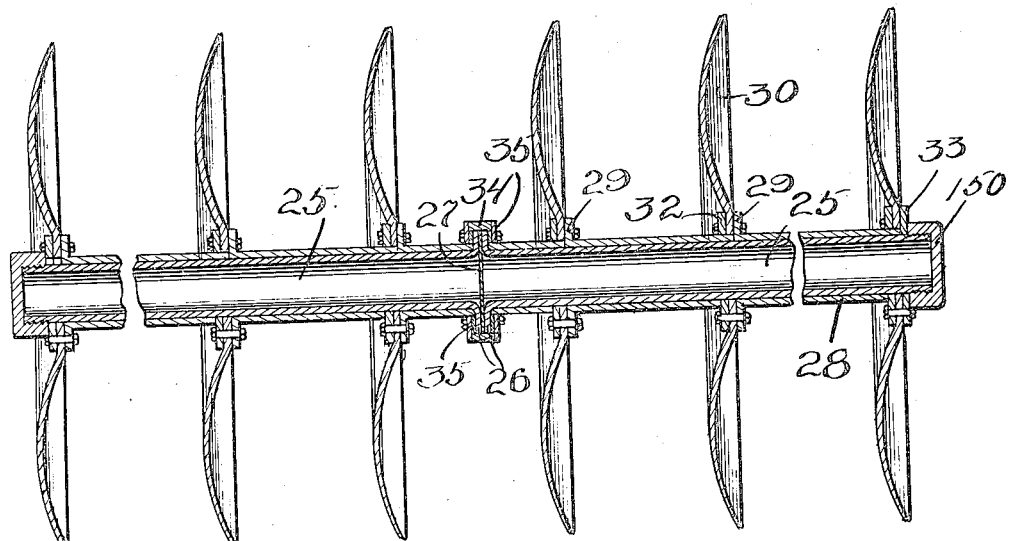
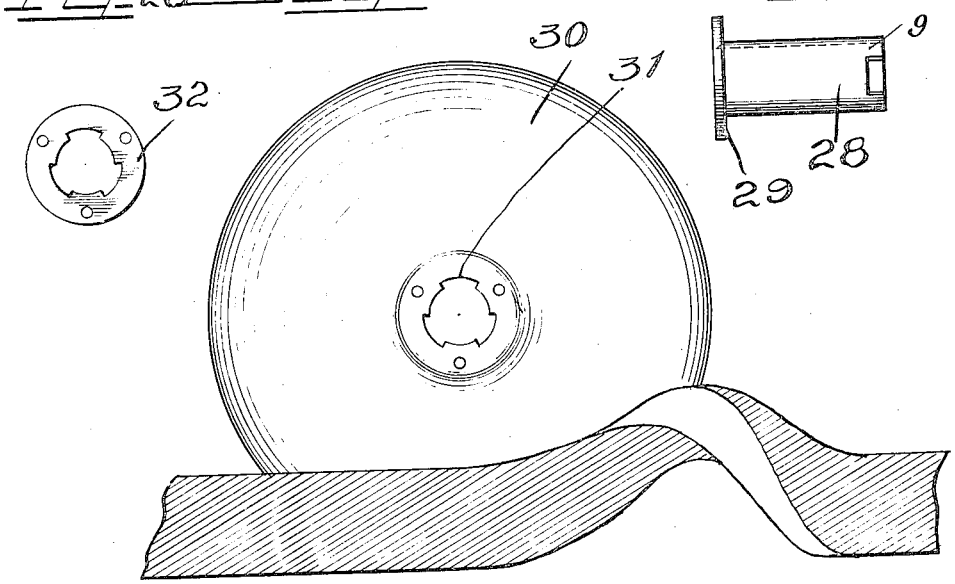

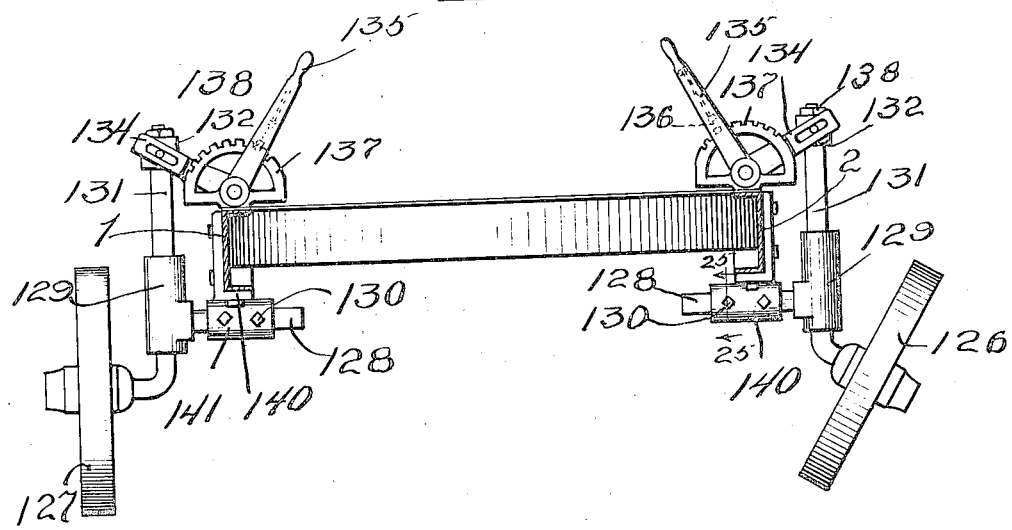

UNITED STATES PATENT OFFICE.

ALBERT E. COOK AND THOMAS VANTUYL, OF ODEBOLT, IOWA; SAID VANTUYL ASSIGNOR TO SAID COOK.

AUTOMOBILE PLOW.

1,158,109.

Specification of Letters Patent. Patented Oct. 26, 1915.

Application filed June 19, 1909. Serial No. 503,262.

*To all whom it may concern:*

Be it known that we, ALBERT E. COOK and THOMAS VANTUYL, citizens of the United States, and residents of the city of Odebolt, in the county of Sac and State of Iowa, have invented certain new and useful Improvements in Automobile Plows; and we do hereby declare that the following is a full, clear, and exact description of the same, reference being held to the accompanying drawings, and to the numbers of reference marked thereon, which form a part of this specification.

This invention relates to that class of plows or agricultural implements set forth in the prior application for patent of Albert E. Cook above named for "Agricultural implements", filed Oct. 20th, 1908, Serial No. 459,139, in which power driven disks are utilized both as the plowing means and also the means for affording traction in propelling a machine operated under its own power.

The object of this invention is to afford a new and improved automobile plowing unit capable of use independently or in conjunction with other mechanisms to be propelled thereby, as, for instance, cutting or harvesting mechanism and pulverizing and seeding mechanisms or any and all other devices capable of being operated in conjunction therewith and from the same source of power.

It is also an object of the invention to afford a machine of the class described affording the utmost facility in steering and adapted to operate with the utmost ease in either direction and capable also of operation so that one set or gang of disks may follow the other, or of an adjustment whereby the gangs operate abreast to greatly increase the width of cut made by the machine.

It is also an object of the invention to afford exceedingly simple and powerful steering and operating mechanism and in conjunction therewith a driving mechanism or transmission operated largely by friction, if desired, and which enables the machine to be driven at any desired rate of travel and which enables increased power to be secured when the driving rate is reduced.

It is also an object of the invention to afford a very rigid frame construction provided with a fifth wheel or turn table at each end thereof, one for each gang of disks, and to afford in connection with the same exceedingly powerful driving mechanism and adjusting mechanism whereby the adjustment of the disk gangs may be effected independently each of the other and also enabling the gangs each to be driven at a different rate of speed.

It is also an object of the invention to afford a plowing and traction disk adapted to act not only through the peculiar shape of the disk but as well to operate in part centrifugally, thus enabling a higher efficiency to be attained than would otherwise be possible.

It is finally an object of the invention to afford a device of the class described so constructed as to insure the greatest adaptability of the construction as a whole to uneven surfaces and whereby the frame is supported yieldingly upon the gang shafts in a manner to permit the machine passing over the most uneven ground without danger of breakage of parts, and also to afford a simple, durable and efficient device of the class described by the use of which a very large surface may be plowed or thoroughly tilled daily without requiring more than one operator for the machine.

The invention consists in the matters hereinafter described and more fully pointed out and defined in the appended claims.

In the drawings: Figure 1 is a side elevation of a machine embodying our invention. Fig. 2 is a top plan view thereof partly in horizontal section and showing the gangs arranged tandem. Fig. 3 is a similar view with the deck, motor, and transmission elements removed and illustrating the arrangement of the gangs abreast. Fig. 4 is an enlarged fragmentary end elevation broken away. Fig. 5 is an enlarged detail section with parts omitted on line 5—5 of Fig. 2. Fig. 6 is an enlarged fragmentary section with parts omitted on line 6—6 of Fig. 2. Fig. 7 is a reduced view partly in section and partly broken away of the lower transmission friction shafts. Fig. 8 is an enlarged section taken on line 8—8 of Fig. 7. Fig. 9 is a section taken on line 9—9 of Fig. 8. Fig. 10 is an enlarged bottom plan view of a part of the transmission mechanism. Fig. 11 is a section taken on line 11—11 of Fig. 10. Fig. 12 is a detail view of a part of the mechanism for adjusting each disk gang relatively the frame. Fig. 13 is a section on line 13—13 of Fig. 12. Fig. 14 is a section on line 14—14 of Fig. 2. Fig. 15 is an enlarged section on line 15—15 of Fig. 2. Fig. 16 is a section on line 16—16 of Fig. 15. Fig. 17 is a fragmentary top plan view with parts omitted and partly in section of the shifting and adjusting devices and mechanisms for operating the machine. Fig. 18 is a section on line 18—18 of Fig. 17. Fig. 19 is a section on line 19—19 of Fig. 18. Fig. 20 is an enlarged view partly broken away and in longitudinal section of one of the gangs of disks. Fig. 21 is a view illustrating the centrifugal action of the disk in turning the soil, such turning effect being shown in a somewhat exaggerated manner. Fig. 22 is a section taken on line 22—22 of Fig. 2, with parts omitted. Fig. 23 is an enlarged sectional view illustrating the attachment of the caster wheel with the main frame. Fig. 24 is a top plan view of the caster stem. Fig. 25 is a section on line 25—25 of Fig. 22. Fig. 26 is a section on line 26—26 of Fig. 24. Fig. 27 is a detail of one of the tubular gang shaft sections. Fig. 28 is a detail of the washer.

As shown in the drawings: The frame of the machine is constructed largely or almost wholly of pressed steel and comprises side sills 1 and 2, of suitable structural form conveniently, as shown, pressed or formed as channels, the flanges of which are turned inwardly, and which, as shown, are rigidly connected at their ends by an annular front and an annular rear frame 3 and 4, to which the ends of the side sills 1 and 2, are rigidly secured by riveting or otherwise.

Journaled to rotate horizontally in each of said annular frames 3 and 4, are the front and rear gangs of plowing disks hereinafter more fully described and on which the machine as a whole is supported and by means of which the propulsion of the machine and the plowing is accomplished.

As shown, an annular fifth wheel 5, is secured within each of the annular frames 3 and 4, as shown in Figs. 5, 6 and 13, and secured thereon in any suitable manner is an internally geared rim 6, which may be bolted or otherwise attached thereto. Extending downwardly from said fifth wheel on diametrically opposite sides thereof are brackets 7, between which are secured at their lower ends bearing boxes 8, which may be of any suitable kind or construction for the purpose, but which may be, if desired, of hard wood or other suitable material. Journaled therein are shafts 10, which extend diametrically across the fifth wheel. Secured in said fifth wheel on opposite sides thereof are brackets 11, which are riveted within said fifth wheel and the ends of which extend outwardly and downwardly and connecting which are transverse beams or struts 12, each of which is provided with a central bearing box 13, through which the shafts 10, pass.

As shown, the oppositely directed alined driving shafts 10, are surrounded by fixed sleeve sections 14 and 15, and their inner ends are connected by means of a differential gear of any suitable or preferred type which as shown in Fig. 5 is inclosed in a suitable casing. A casing 16, incloses a bevel gear 17, adapted to drive the differential. A cage 18, extends alongside of the bevel gear 17, and a vertical shaft 19, is journaled therein and provided with a bevel pinion 20, which meshes with said bevel gear. As shown also, anti-friction bearings are provided on said shaft above and below said pinion 20, to hold the thrust thereof when in operation.

Side beams 21, are secured to brackets 7, and pivotally secured thereto at one end are the half elliptic springs 22—23, between which the outer bearing box for the sleeves 14—15 respectively are secured and in which the shafts 10, are journaled. The outer and downward end of said spring 22 is pivotally secured to the lower half of the bearing box 24, as shown in Figs. 4 and 14. To the upper half of the bearing box is rigidly secured (by means of the bolts which secure the two halves of the bearing box together) a plate 201, provided with parallel ways or lugs 202, providing a space therebetween to receive the end of the lower leaf of the spring 23, therein and a pin 203, secured to the ways holds the spring between the ways and permits free sliding of the upper spring relatively of the bearing box.

Journaled in said boxes 24, are the gang shafts. These, as shown, are tubular and consist each of a tubular section 25, comprising half the length of the shaft as a whole, as shown in Fig. 20, and at the inner end provided with an outwardly turned flange 26, which abuts against an anti-friction plate 27, of any suitable material engaged between the inner ends of said shafts at said flanges. Fitted on said shaft sections 25, are short tubular sections 28, each of which is flanged at one end to afford a collar 29, which bears against a flat face at or near the center of the double concave plowing disks 30, each of which, as shown, is shaped at its center to fit on the inner shaft 25, and is provided with recesses 31, as shown in Fig. 21, to receive a plurality of prongs 9, on the end of the adjacent tubular section 28, which thereby rigidly fixes said disks from rotation on said shaft. As shown, a collar or washer 32, is provided on the opposite side of each disk from the collar 29, which also is provided with a central aperture adapted to receive the prongs on said tubular shaft sections so that when the shaft with the disks are assembled a structure of great strength is afforded. The flange 29, disk 30, and washer 32, are bolted together. As shown, hub caps 150, each bearing against a suitable washer 33, on the outer end of each tubular shaft 25, are provided and act to firmly jam and hold the disks from movement longitudinally on the shaft.

Engaged about the flanges 26, in the inner ends of the tubular shafts 25, is a steel band 34, against which fit the collars 35. Suitable packing is provided between the flanges 26, and said collars so that in case of necessity the two halves of said shaft may rotate at slightly different rates.

The disks 30, shown are of large size, usually in the neighborhood of thirty six (36) inches in diameter and are concaved at one side at the hub and on the other from near the hub to the periphery, so that the attachment of the disk with the shaft is at all times practically in the same plane with the periphery of the disk, thus affording in the disks much greater strength than would otherwise be the case and affording a larger clearance at the center or between the adjacent disks on the shaft and what is more important, affording a curvature near the periphery of the disks which enables the disk to act centrifugally in turning the soil and cleaning itself while maintaining its full cutting efficiency.

Power is transmitted to the disks from the shafts 10, in any suitable manner. Preferably, however, a chain drive is employed and for this purpose a globular or ball shaped casing 36, is provided on the ends of the sleeves 14 and 15, for the driving shaft 10, fitted within which are the cups 37—38, of ball bearings, the complemental cones 39 and 40, of which are secured on the elongated hubs 41, of a sprocket wheel 42, rigidly secured on the outer end of each shaft 10, as shown in Fig. 16.

Rigidly secured near each end of each gang shaft and in alinement with the sprocket wheel 42, is a sprocket wheel 43, about which and the sprocket wheel 42, is trained a chain 44, whereby the drive is transmitted. Said chain passes through apertures in the globular casing.

Secured on the cage or casing 36, is a chain and sprocket case 45, conveniently of sheet metal and which wholly incloses the chain and said sprocket wheel, and as shown, secured on the gang shaft are blocks of wood 46, which fit to said shaft and on the outer side of said case to enable the shaft to have some play therein longitudinally of the same without exposing and opening thereinto to permit access of dirt. As shown, each of the globular casings 36, is provided on its outer side with a nut 47, adapted to be removed to permit access to the bearings on said shaft and to the sprocket wheel or chain.

The frame is decked over with sheet metal or other suitable material and supported, as shown, centrally thereon is a gasolene engine 48, the crank shafts 49, of which extend longitudinally of the machine from end to end thereof. Supported and rigidly secured on the shafts 19, whereby the driving shafts for the gangs are actuated are thin friction disks 50, circular in form, as shown in Figs. 2 and 5.

Secured longitudinally of each of the annular frames and directly beneath the crank shaft 49, is a frame comprising outwardly facing channels 51, which are secured in parallel relation to the boxing on each side of the differential and bearing for the shaft 19. At one end said channels 51, are rigidly secured together and also supported on said annular frame by means of a bracket 52, as shown in Fig. 5, which extends upwardly and rearwardly and engages on said frame and at the opposite extremities the channels 51, are connected and supported upon a hanger 53, attached to a bracket 54, secured on the frame of the machine, and which also supports the bearing 55, for the outer end of the engine shaft. Eccentrically journaled in the end members of said frame and also on a central pivot bearing 56, which affords also the boxing for the shaft 19, are shafts 57 and 58, on the shaft 57, and rigidly secured beneath a fixed friction wheel 60, is a pressure friction wheel 59, adapted to coact with the friction wheel 60, on the engine shaft 49, in reversing the movement of the machine and slidably secured on the shaft 57, beneath the slidable friction wheel 62, on said engine shaft 49, is a slidable friction pulley 61. Said friction pulley 61, is housed in a casing comprising sections 143—143 which are bolted together and feathered on the shaft. Also feathered on the shaft in the casing is a bearing ring 144, formed of two sections which are bolted together and are shaped to provide a peripheral ball race. Said friction wheel 61, is rotatable in the casing with one side projecting therethrough and fits over the bearing ring and affords an inner peripheral groove to form with the bearing ring a ball race in which are balls, rollers or the like.

Means are provided for simultaneously adjusting said slidable pressure friction wheel 62, and friction pulley 61, on the respective shafts to vary the speed of drive. As shown, the slidable friction wheel and friction pulley are arranged on the forward end of the engine shaft at the front end of the machine, and, inasmuch as the friction disks 50, rotate oppositely in the respective annular frames at the ends of the machine, the slidable friction wheel and roller on the rear drive are also near the extremity of the shaft and the fixed friction wheel and roller are adjacent the engine.

Means are provided for partly rotating either the shaft 57, or 58, to bring the friction rollers thereon into engagement beneath the disk 50, thereby springing the edge of the disk upwardly to bring the same into positive engagement with the corresponding friction wheel or pulley on the engine shaft. For this purpose, as shown, a steering mast 63, provided at its upper end with a hand wheel 64, is secured to extend through the deck conveniently at one side of the middle of the machine, and as shown, a base 65, therefor is bolted in place beneath the deck, journaled in which are the alined forwardly and rearwardly extending shafts 66 and 67, which extend respectively through the annular frame above the fifth wheel, as shown in Figs. 2 and 4, and are journaled at their outer ends in suitable bearings 68, secured on said annular frame members. Secured on the outer end of each of said shafts, (the transmission for the rear gang driving mechanism being the same as for the forward mechanism) is a crank arm 69, which is connected by means of a rod or link 70, with a crank arm 71, secured on the eccentrically journaled shaft 57, so that rotation of the shaft 66, in one direction acts to throw the pressure friction roller 61, upwardly into engagement with the friction disk 50, while rotation in the opposite direction, owing to the eccentricity of the bearings of said shaft, acts to swing the said roller out of engagement with said disk. For the purpose of rotating said shaft sufficiently to accomplish this adjustment a miter gear segment 72, is secured on said shaft 66, and meshes with a complemental miter gear segment 73, which is journaled on a stud shaft 74, which extends laterally from the base casting 65, for the steering mast. Rigidly secured on the outer end of the shaft 74, is a toothed segment 75, adapted to be engaged by a detent 76, engaged upon a lever 75ª, which, as shown, is rigidly engaged on an arm 79, integral with the segment 73, so that the operator, at operating position, as, for instance, the reversible seat 80, may rotate said shaft should he so desire. Also rigidly engaged on the shaft 66, is a crank arm 81, with which is connected a link 82, or rod such as before described, the inner end of which is pivotally engaged on a crank arm 83, secured on the eccentric shaft 58. Said crank arms 69 and 81, are so secured on the shaft 66, that when adjusted in neutral position both the pressure friction pulleys 61 and 59, are out of engagement with the driving disk from which position farther rotation in either direction of said shaft acts to throw one or the other of said pressure friction rolls (dependent upon the direction of rotation) into engagement with the driving disk, as before described.

All the details of construction for the rear driving mechanism are duplications of those for the front drive except that on the adjusting shaft 67, for the rear eccentric shafts, the miter gear segment 84, projects oppositely from the miter gear segment 72. It is engaged, however, by a corresponding miter gear segment 85, on a stud shaft 86, actuated by a lever 87, such as before described, and as shown also, a segment 88, is provided to hold the lever in adjusted position by means of a suitable detent.

Means are provided for shifting the pressure friction roller 61, and friction pulley or wheel 62, simultaneously on the eccentric and the engine shafts respectively. For this purpose a sleeve 151, is provided on the shaft 66, within each annular gang frame. At the rear end of said sleeve is provided a knuckle 89, with which is pivotally engaged a rod 90, provided at its end adjacent the steering shaft with a rack 91, on the inner side thereof, as shown in Fig. 17.

Secured on the steering mast 63, is a tubular shaft 92, provided with an actuating wheel 93, at the upper end thereof and extending down through the steering frame 65, as shown in Fig. 18. Also rotatably secured on said tubular shaft or sleeve 92, is a third or outer shaft 94, provided with an actuating wheel 95, and provided at its lower end in a suitable boxing on the upper side of the steering and actuating frame with a pinion 96, with which the rack bars 91 and 97 for the front and the rear transmissions respectively mesh.

The sleeve 151 at its forward end is provided with a knuckle 98, which is connected by means of a link 99, with a lever 100, one end of which is fulcrumed on the annular frame before described, and the other end of which is provided with a fork which suitably engages the hub of the friction pulley or wheel 62, while a branch 101, of said lever extends beneath the driving friction disk, as shown in Fig. 4, and engages the hub of the pressure friction roller 61, so that by the rotation of the shaft 94, by means of the hand wheel 95, the friction pulleys or wheels 62, and pressure friction rollers 61, and the corresponding friction wheels and pressure friction rollers for the rear gang transmission are shifted radially of the driving disk, thus enabling the rate of drive to be varied at the will of the operator without varying the drive of the engine and also enabling either increased power or increased speed to be secured dependent upon the radial adjustment of said friction elements. Means are also provided for steering the machine by rotating the gangs horizontally in the frames therefor. For this purpose, as shown, miter friction wheels 102 and 103 are rigidly secured on the engine shaft, a pair thereof being secured above each gang and facing inwardly. Slidably secured on the shaft by means of a sleeve 104, is a shaft 105, integral with the sleeve 104 on which is journaled a bevel friction wheel 106, complemental with the bevel friction wheels 102 and 103, and adapted to be driven by either when shifted into engagement therewith. A suitable casing 107, incloses said friction wheels to protect the same from dirt and dust, and extending through the side thereof, as shown in Figs. 2, 10 and 11, is a shaft 108, which extends concentrically into the shaft 105, for said bevel friction 106, and on the outer end of which is provided a crank arm 109. As shown the side of the casing 107, is slotted correspondingly to receive the end of the shaft 108. Pivotally engaged on the casing above said crank arm and depending therefrom below the end of the arm and also pivotally engaged on the crank arm intermediate its ends, is a lever 110. This, as shown, is provided with an aperture in its outer end adapted to receive the end of the shifting arm 111, which, as shown, is rigidly engaged on a sleeve 112, and slidable on the sleeve 151, before described, and which, as shown, is provided at its inner end with a knuckle 113, with which is pivotally engaged a shifting rod 114, the inner end of which is pivotally engaged on a crank arm 115, secured on the central adjusting shaft or mast 63. In a similar manner an adjusting rod 116, similarly connected at its rear end with a sleeve which engages to shift a corresponding bevel friction in a transmission device is pivotally engaged on a crank arm 117, on the shaft or sleeve 92, through which the shaft 63, extends.

Rigidly secured on the hub of the bevel friction wheels 106, is a gear wheel 118, which meshes with a complemental pinion 119, secured on the horizontal steering shaft 120, which, as shown, extends across the annular frame and is journaled in suitable bearings at its ends secured within said annular frame above the internal gear. Senured on said shaft at each end thereof are worms 121, which mesh each with a worm gear wheel 122, each on the forward side of the shaft so that said worm gear wheels both rotate in the same direction, said worm gear wheels being journaled in a suitable boxing 123, rigidly secured in the annular frame above the internally toothed gear in said annular frame, and as shown, rigidly connected with said worm gear is a pinion 124, which meshes with said internal gear 6, so that the rotation of the shaft 120, acts to turn the fifth wheel beneath the machine thereby adjusting the gangs relatively the main frame.

The transmission devices at each end of the machine may be covered and inclosed in a suitable hood 126, which may also contain the radiated devices to keep the engine cool should a gasolene or other explosion motor be employed as will usually be the case.

The operation is as follows: The operator from the reversible seat 80, may vary the speed of the machine at any desired rate within its capacity, may steer the same, and effect all adjustments from the central operating position without leaving the seat. Ordinarily, when it is desired to move the machine without plowing, the gang shafts are arranged at substantially a right angle with the longitudinal axis of the machine, as shown in Fig. 2. With this adjustment the machine may be driven in either direction practically without disturbing the soil. When it is desired to plow, however, the gang shafts are arranged more or less obliquely with reference to the main frame, this being accomplished by means of the steering wheels 64 and 93. When so arranged, the thrust of one set of disks may, if desired, counteract wholly or in part the thrust of the other set. In consequence, the machine may readily be caused to follow a straight course or by the relative adjustment of the gang shafts with respect to the main frame, the direction of travel may be varied at will.

With the arrangement just described one set of gangs follows substantially behind the other, the front set in that case serving in part as trash cutters and beginning the turning of the soil, while the completion of the turning and pulverizing of the soil is effected by the rear gang.

Of course, a furrow wheel 126, or land wheel 127, may be employed and secured at any convenient point on the machine to assist in maintaining the proper direction. These, however, are ordinarily not required when the gangs are operated tandem, as it has been found by experience that the machine may be readily directed or guided without the aid of such auxiliaries. Should it be desired to use the same, however, a suitable bracket 140, may be secured on each side of the machine at a convenient point on the frame provided with a horizontal sleeve 141 adapted to receive an arm 128, therein which is integrally connected with a vertical sleeve 129, the adjustment of which either outwardly or inwardly from the side of the machine may be arranged by means of set screws 130, in the sleeve 141. The furrow wheel 126, and the land wheel 127, are each journaled on a caster stem 131, adapted to rotatably extend through the sleeve 129, and as shown, a rotatable collar 132, is removably secured on the upper end of each of said caster stems and adapted to be engaged by a yoked lever 134, rigidly connected with the hand lever 135, and as shown, a spring detent is provided on said hand lever 136, adapted to engage a toothed segment 137, suitably secured with reference thereto whereby the caster or furrow wheels may be elevated sufficiently to clear the ground or may be lowered into operative position. Said land and furrow wheels or either the land or furrow wheel may be employed on either side of the frame inasmuch as the same are interchangeable by merely removing the nut 138, from the upper end of the caster stem, thereby permitting the removal of the stem of one wheel and inserting the stem into the other.

When it is desired to plow as large a surface in a given time as possible, the machine may be arranged with the respective gangs substantially abreast, as shown in Fig. 3. When so arranged, the machine is balanced upon the respective gangs by means of the laterally disposed furrow or land wheels and the machine when so arranged moves obliquely forwardly, cultivating or plowing a strip approximately equal to the sum of the length of the gang shafts. When operated in this manner it may be, and usually is desirable to adjust the gangs so that the thrust of the front gang of cutting disks shall counteract the thrust of the rear gang. This is easily accomplished by means of the steering mechanism and there being no obstruction beneath the frame of any kind or nature, either gang may be turned so that the concave cutting face of the disks may be directed to either the right or the left, as preferred, and in Fig. 3, an adjustment is shown wherein the gangs of disks are adjusted for the thrust of the respective gangs to substantially balance each other.

The efficiency of the machine in plowing is greatly augmented owing to the high peripheral velocity of the disks as compared with the rate of travel of the machine, inasmuch as considerable slippage of the disks in the soil takes place, part of the energy applied being consumed in the lateral and upward thrust of the soil and the slippage of the disks and a part in the forward movement of the machine. When the disks are of large diameter such high peripheral speed of rotation renders the same self-cleaning and acts upon the soil centrifugally with the result of partly turning the same as illustrated in a somewhat exaggerated manner in Fig. 21, at the same time pulverizing the soil thoroughly.

Of course, an independent motor may be employed for each gang if desired, and the particular transmission, while very efficient may be varied, and other means may be employed for positively locking the gangs in adjusted position than the worm and gear hereinbefore described.

Any particular type of differential may be employed and we have therefore not given a detailed description of the differential employed on the driving shaft for the gangs, and it is to be understood that any stock or preferred type of differential gear may be employed. So too it is to be understood that while we have described the invention as constructed mainly of pressed steel, such structural materials are not indispensable for any suitable materials may be employed.

While the particular spring suspension serves admirably and admits of the utmost freedom of movement of the gangs in passing over uneven surfaces without disturbing the general level of the deck of the machine, it is not to be understood that this particular spring suspension is indispensable although important and very convenient, and, of course, it is to be understood the disks may be of any suitable size, number or arrangement and also that the number of gangs may vary.

Auxiliary devices and other agricultural machines may be employed in connection with our invention, or a plow embodying our invention may serve as a tractor therefor and very many details of construction, arrangement and adaptation may be varied without departing from the principles of our invention. We therefore do not purpose limiting this application for patent otherwise than necessitated by the prior art.

We claim as our invention:

1. A plow comprising sets of interfitting frames, the inner frame of each set rotatable, gangs of plow disks connected with the inner frames, one gang adapted to follow the other or all the gangs of disks adapted to operate abreast and power operated means for independently adjusting each gang of disks.

2. In a device of the class described a frame, a plurality of circular tracks rigidly secured thereon, rotatable members secured on said tracks, gangs of disks and springs connecting the gangs of disks to said rotatable members at a position other than in line with a diameter of said members.

3. In a plow a frame, a shaft, plowing disks secured to the shaft, spring suspensions provided with bearing blocks on the lower ends to receive the ends of the shaft and pivoted at their upper ends to the frame.

4. In a plow a frame, circular tracks thereon, rotatable channel members supported by the tracks, gangs of plows secured to said rotatable members and spring suspensions secured to the rotatable members at one end and to the gangs of plows at the opposite end.

5. In a device of the class described a frame, rotatable frames, gangs of rotatable disk plows secured to the rotatable frames and spring suspensions secured to the gangs and pivoted to the rotatable frame to support the frame from the disks.

6. In a device of the class described a frame, a rotatable frame secured thereto, a drive shaft rotatable with the frame, a driven shaft rotatable with the frame, disk plows thereon, means actuating the driven shaft from the drive shaft and springs pivoted to the rotatable frame and supporting the driven shaft.

7. In a device of the class described a frame, a rotatable frame secured thereto, a drive shaft rotatable with the frame, a driven shaft rotatable with the frame, disk plows thereon, means actuating the driven shaft from the drive shaft, springs pivoted to the rotatable frame and supporting the driven shaft, a motor, transmission mechanism operated thereby for actuating the drive shaft, and means for rotating the rotatable frame.

8. In a machine of the class described a frame, a rotatable member secured thereto, a driven shaft carried by the rotatable member, a plow shaft, plow disks secured thereto, driving chains connecting the driven shaft and the plow shaft, spring suspensions pivoted on the ends of the driven shaft having their upper ends pivoted to the rotatable member and their lower ends pivoted to the plow shaft.

9. In a device of the class described a main frame, a motor thereon, rotatable frames supported by the main frame, mechanism for independently rotating the frames, friction mechanism operated by the motor for actuating said mechanism to rotate the frames in either direction, a set of cultivating implements supported by each rotatable frame, mechanism for rotating the cultivating implements, a friction disk for actuating the same, oppositely disposed friction members adjustable across the face of the friction disk for varying the drive of the cultivating implements, and oppositely disposed friction members non-adjustable across the face of the friction disk for reversing the rotation of the cultivating implements.

10. In a device of the class described a frame, an engine mounted thereon with its shaft directed longitudinally thereof, driving friction elements on said shaft, friction disks adapted to be rotated by part of said friction elements, actuating mechanism driven by said disks, gangs of implements operated by each actuating mechanism, an annular gear connected with each gang of implements and mechanism operated by part of the friction members on the engine shaft for rotating said annular gear.

11. In a machine of the class described a frame, an engine mounted thereon, a drive shaft operated by the engine, a rotatable frame, a gang of plowing disks carried by the rotatable frame, mechanism operated from the drive shaft for rotating the frame thereby adjusting the position of the gang of disks, mechanism operated from the drive shaft for rotating the disks, land and furrow wheels pivoted to the frame, mechanism for adjusting the same vertically and means permitting the wheels being adjusted horizontally toward or from the frame.

12. In a motor disk plow a frame, a motor thereon, disks driven by the motor, means for adjusting the direction of movement of the disks, land and furrow wheels pivoted to the frame, and leaf springs supporting the plowing disks.

13. An automobile plow embracing a frame comprising in part a plurality of annular frames engaged together by means of the main frame, a motor on the frame, a gang of power driven plow disks, leaf springs supporting the same in each of the annular frames and power operated annular gearing for adjusting said gang frames.

14. The combination with a main frame, a motor and means for supporting one end of said frame, of a circular frame in the other end thereof, a gang of plowing disks journaled therein to swing horizontally, said disks arranged in alined groups and capable of differential movement, and means for adjusting said gang in the circular frame embracing a transmission element operated by the motor and a train of gears connected with the transmission element and with a gear on the gang frame.

15. The combination with a main frame and driving means supporting one end thereof, of a circular frame secured on each end of the main frame, a fifth wheel secured to rotate therein, gangs of coaxial driving and plowing disks adapted to be driven differentially and journaled on the fifth wheel, a motor and operative connections therewith for driving said gang in either direction and also for rotating the fifth wheel.

16. A machine of the class described embracing two annular frames, a main frame bracing said annular frames, coaxial differentially driven gangs of plowing and propelling disks engaged in each annular frame to turn as a whole horizontally therein, a motor supported on said frame, a shaft therefor, and operative connections therewith to adjust said gangs with respect to each other and connections adapted to drive the gangs.

17. In a machine of the class described a rotatable and adjustable gang of coaxial plowing and propelling disks and a motor carried thereon for adjusting and differentially driving the same.

18. In a plowing machine a main frame, gangs of plowing disks supporting the same, cantaliver elliptic leaf springs interposed between the frame and gangs to prevent vibration of the frame as the gangs plow uneven surfaces, a motor supported on the frame, driving mechanism operated thereby for actuating the gangs of plows, mechanism adapted to rotate the gangs horizontally for steering the plow and friction elements for selectively actuating the mechanism to rotate the gangs in either direction.

19. In a plowing machine a main frame, gangs of plowing disks supporting the same, springs interposed between the frame and gangs to prevent vibration of the frame as the gangs plow uneven surfaces, a motor supported on the frame, driving mechanism operated thereby for actuating the gangs of plows, mechanism adapted to rotate the gangs horizontally for steering the plow, friction elements for selectively actuating the mechanism to rotate the gangs in either direction, steering shafts secured to the frame and connected to shift the appropriate friction elements in steering, and wheels secured to the shafts.

20. In a plowing machine a main frame, gang of plowing disks supporting the same, springs interposed between the frame and gangs to prevent vibration of the frame as the gangs plow uneven surfaces, a motor supported on the frame, driving mechanism operated thereby for actuating the gangs of plows adapted to rotate the gangs horizontally for steering the plow, friction elements for selectively actuating the mechanism to rotate the gang in either direction, steering shafts secured to the frame and connected to shift the appropriate friction element in steering, wheels secured to the shafts, and a shaft connected to actuate the mechanism for varying the speed of the plows and all of said shafts concentrically arranged and operated from one position on the frame.

21. A plowing machine comprising gangs of plowing disks, a frame supported thereby, a motor thereon for driving the gangs, and land and furrow wheels adjustable vertically and horizontally and rotatably held in any adjustment.

22. A plowing machine comprising gangs of plowing disks, a frame supported thereby, a motor thereon for driving the gangs, land and furrow wheels adjustable vertically and horizontally and rotatably held in any adjustment, levers for effecting the adjustment of said wheels and said wheels rotatable in a horizontal plane in any adjustment to automatically adjust themselves to the travel of the plow.

23. In a motor plow gangs of plowing disks, a frame, strong cantaliver springs supporting the frame on the gangs of disks, an engine on the frame having its shaft extending longitudinally of the frame, a mechanism adapted to be operated from the engine shaft for actuating the gangs of disks and a mechanism operated from the engine shaft for adjusting the gangs of disks independently to steer the machine.

24. In a motor plow coaxial gangs of plowing disks, a frame, strong springs supporting the frame on the gangs of disks, an engine on the frame having its shaft extending longitudinally of the frame, a friction driven differential mechanism adapted to be operated from the engine shaft for actuating the coaxial gangs of disks, a friction mechanism operated from the engine shaft for adjusting the gangs of disks to steer the machine, bearings at the outer end of the engine shaft, and means inclosing the engine shaft and mechanism operated therefrom.

25. In a device of the class described a frame, circular track members arranged at each end thereof, circular frames movable in said track members, gear teeth provided on said circular frames, a pinion journaled on said track members adapted to engage said teeth to move said circular frames, a motor mounted on the frame, a worm connected to drive said pinion, and friction driving mechanisms connected between said motor and said worm whereby said circular frame may be adjusted relative said track members.

26. An automobile plow comprising a main frame, a rotatable frame secured thereto, a driven shaft rotatable with the frame, a plow shaft, plowing disks thereon, sprocket wheels on the ends of the shafts, sprocket chains trained around the sprocket wheels, chain guards inclosing the chains and sprocket wheels, a bevel gear on the driven shaft, a bevel gear meshing therewith, a shaft secured to the last named bevel gear, a horizontal friction member secured to said shaft, a motor on the main frame and a plurality of friction members driven thereby each adapted to drive the horizontal friction member.

In testimony whereof we have hereunto subscribed our names in the presence of two subscribing witnesses.

ALBERT E. COOK.
THOMAS VANTUYL.

Witnesses:
GUY S. RANSTEAD,
JAMES S. SLATON.